US010246143B2

(12) United States Patent
Nakata et al.

(10) Patent No.: US 10,246,143 B2
(45) Date of Patent: Apr. 2, 2019

(54) AIRFLOW STRAIGHTENING STRUCTURE OF AUTOMOTIVE VEHICLE

(71) Applicant: MAZDA MOTOR CORPORATION, Hiroshima (JP)

(72) Inventors: Akihiro Nakata, Higashihiroshima (JP); Shuichi Nakagami, Higashihiroshima (JP); Morihide Yamada, Hiroshima (JP); Masaya Nishimoto, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 15/648,660

(22) Filed: Jul. 13, 2017

(65) Prior Publication Data
US 2018/0050743 A1 Feb. 22, 2018

(30) Foreign Application Priority Data

Aug. 22, 2016 (JP) ................................. 2016-161784

(51) Int. Cl.
B62D 35/02 (2006.01)
B62D 29/04 (2006.01)

(52) U.S. Cl.
CPC ........... B62D 35/02 (2013.01); B62D 29/041 (2013.01)

(58) Field of Classification Search
CPC .............................. B62D 35/02; B62D 29/041
USPC ................. 296/180.1, 180.2, 180.4; 180/901
See application file for complete search history.

(56) References Cited

FOREIGN PATENT DOCUMENTS

| JP | 2007-283912 A | 11/2007 | |
|---|---|---|---|
| JP | 2010-208578 A | 9/2010 | |
| JP | 2013-010472 A | 1/2013 | |
| JP | 2015-058779 A | 3/2015 | |
| WO | WO-2013088579 A1 * | 6/2013 | ............. B60K 11/04 |

* cited by examiner

Primary Examiner — Dennis H Pedder
(74) Attorney, Agent, or Firm — Studebaker & Brackett PC

(57) ABSTRACT

An airflow straightening structure of an automotive vehicle, in which slits for traveling-air peeling off (separation) and connection portions for cover reinforcing are adjacently provided at a rear-end edge portion of a cover having a substantially-flat airflow straightening face extending in a vehicle longitudinal direction, wherein protrusions are provided to extend in a direction crossing the vehicle longitudinal direction along a cover surface of the cover which are positioned in front of the connection portions.

8 Claims, 11 Drawing Sheets

AIRFLOW STRAIGHTENING STRUCTURE OF AUTOMOTIVE VEHICLE

BACKGROUND OF THE INVENTION

The present invention relates to an airflow straightening structure of an automotive vehicle, in which a slit and a connection portion are adjacently provided at a rear-end edge portion of a cover having a substantially-flat airflow straightening face extending in a vehicle longitudinal direction.

In general, straightening an underfloor or the like of an automotive vehicle has been achieved by using a cover for the purpose of improving the fuel economy (gas mileage). While it is preferable in order to make traveling air peel off (separate) that a rear edge portion of the cover be formed in an acute (sharp) angle shape, in a case where a fiber-based material having the high sound absorbing performance is applied to the cover, it is difficult to form the rear edge portion of the cover in the acute angle shape.

Japanese Patent Laid-Open Publication No 2007-283912 discloses a structure in which an under cover, which is a resin molding product made of polyamide resin or the like, is provided with a protrusion portion which integrally comprises a front side portion which is configured such that its front side is located at a higher level than its rear side and a rear side portion which is continuous from a lower end of the front side portion and extends obliquely rearward such that its rear side is located at a higher level than its front side, and a slit is provided at a portion of the rear side portion which is positioned just in back of the front side portion, thereby increasing the traveling-air peeling off (separation) performance.

Herein, in a case where the above-described traveling-air peeling off (separation) structure is applied to a whole part, in the vehicle width direction, of the cover, if the length of the vehicle width direction of the slit is set to be long, the strength of the cover may decrease improperly. Accordingly, it is necessary to form a connection portion (non-slit forming portion) for reinforcing. However, this connection portion (non-slit forming portion) provides the poor traveling-air peeling off (separation) performance, so there was room for improvement in this regard.

SUMMARY OF THE INVENTION

Accordingly, an object of the present invention is to provide an airflow straightening structure of an automotive vehicle which can improve the traveling-air peeling off (separation) performance even at the connection portion, securing the rigidity of the cover, and further improve the traveling-air peeling off (separation) performance by guiding the traveling air to the slit having the high traveling-air peeling off performance.

The present invention is an airflow straightening structure of an automotive vehicle, in which a slit and a connection portion are adjacently provided at a rear-end edge portion of a cover having a substantially-flat airflow straightening face extending in a vehicle longitudinal direction, wherein a protrusion is provided to extend in a direction crossing the vehicle longitudinal direction along a cover surface, which is positioned in front of the connection portion. Herein, the above-described protrusion may be a bead which is formed by a portion of the cover surface which is protruded.

According to the present invention, the cover can be reinforced by the protrusion, and therefore the rigidity of the cover is so increased that the width of the connection portion can be narrower. Thereby, the width of the slit is made wider, so that the traveling-air peeling off (separation) performance of the slit can be improved. Further, since the traveling air can be guided to the slit by an end portion of the protrusion, the traveling-air peeling off (separation) performance can be further improved, thereby controlling the flow of the traveling air toward the connection portion. That is, the slit can be enlarged by providing the protrusion and the traveling air is so guided to the slit by the protrusion that the traveling-air peeling off (separation) performance can be improved. Moreover, the traveling-air peeling off (separation) performance can be improved by the protrusion itself, so that flowing of the traveling air toward the connection portion can be suppressed.

To sum up, improving of the traveling-air peeling off (separation) performance even at the position of the connection portion can be achieved by the protrusion, securing the rigidity of the cover, and further improving of the traveling-air peeling off (separation) performance by guiding the traveling air to the slit having the high traveling-air peeling off performance can be achieved.

In an embodiment of the present invention, the slit is composed of plural slits which are aligned substantially in a vehicle width direction at the rear-end edge portion of the cover, and the connection portion is composed of plural connection portions which are formed as non-slit forming portions which are respectively positioned between the adjacent slits at the rear-end edge portion of the cover.

According to this embodiment, the above-described effects of the present invention can be provided properly.

In another embodiment of the present invention, the rear-end edge portion of the cover includes an extension portion which extends substantially linearly along a vehicle width direction and a slant portion which extends obliquely relatively to the vehicle longitudinal direction and the vehicle width direction, the extension portion and the slant portion being provided adjacently, and the slit is formed at the extension portion and the connection portion and the protrusion are formed at the slant portion.

According to this embodiment, the guiding effect of the traveling air by the protrusion can be secured, and also the slant portion extends so obliquely that the cover can be reinforced by the protrusion, reducing an aerodynamic-characteristic width of the connection portion and the protrusion formed at the slant portion, when viewed from the vehicle longitudinal direction, and the traveling air can be smoothly guided rearward in the vehicle width direction even at the protrusion. In other words, the reinforcing effect by means of the connection portion, the air guiding effect by means of the protrusion, and the traveling-air peeling off (separation) effect by means of the slit can be optimized at a high level.

In another embodiment of the present invention, the cover is an under cover which is arranged below a floor of the vehicle, a rear end of which is attached to a vehicle-body member via an attachment portion, the extension portion is positioned substantially just in front of the attachment portion of the under cover, and the slant portion is composed of a pair of right-and-left slant portions which respectively extend obliquely rearward and laterally from right-and-left end portions of the extension portion such that the pair of slant portions are positioned substantially obliquely in front of the attachment portion.

According to this embodiment, even at the attachment portion where the slit, the connection portion, and the protrusion are unable to be aligned substantially in the vehicle width direction, these portions are arranged so properly that the reinforcing effect of the connection portion, the air guiding effect of the protrusion, and the traveling-air peeling off (separation) effect of the slit can be provided properly.

In another embodiment of the present invention, the protrusion formed at the slant portion integrally includes an extending protrusion portion which extends substantially in the vehicle width direction continuously from the protrusion.

According to this embodiment, even in a case where there exists a gap between the protrusion and the slit which are formed at the slant portion, an airflow which may flow down through the gap can be blocked and guided to the slit by the extending protrusion portion of the protrusion which is configured to extend substantially in the vehicle width direction continuously from the protrusion. Thereby, the traveling-air peeling off (separation) effect of the slit can be enhanced.

In another embodiment of the present invention, a length of the direction crossing the vehicle longitudinal direction of the protrusion is set to be substantially equal to or longer than a length of a direction crossing the vehicle longitudinal direction of the connection portion.

According to this embodiment, since the length of the direction crossing the vehicle longitudinal direction of the protrusion is set as described above, the traveling air can be surely guided to the slit, thereby further improving the traveling-air peeling off (separation) performance.

In another embodiment of the present invention, the cover is made of fiber reinforced resin or a nonwoven fabric or woven fabric.

According to this embodiment, lightweight and high rigidity and damping properties of the structure comprising the fiber-reinforced-resin made cover or the nonwoven-fabric or woven-fabric made cover can be attained as well.

In another embodiment of the present invention, the connection portion provided at the rear-end edge portion of the cover is configured such that a basic cross sectional portion thereof is of a crank shape and a thick portion which is thicker than the basic cross sectional portion is provided at a central portion, in a vehicle width direction, thereof.

According to this embodiment, the traveling air which flows down through a gap between the slit and the protrusion positioned in front of the connection portion can be made to effectively peel off (separated) by both-side portions of the connection portion which have the crank-shaped basic cross section, and also the whole rigidity of the connection portion can be properly increased by the thick portion provided at the central portion of the connection portion. Thereby, the traveling-air peeling off (separation) and the cover reinforcing can be compatibly attained.

Other features, aspects, and advantages of the present invention will become apparent from the following description which refers to the accompanying drawings.

DETAILED DESCRIPTION OF THE INVENTION

Figure 1:
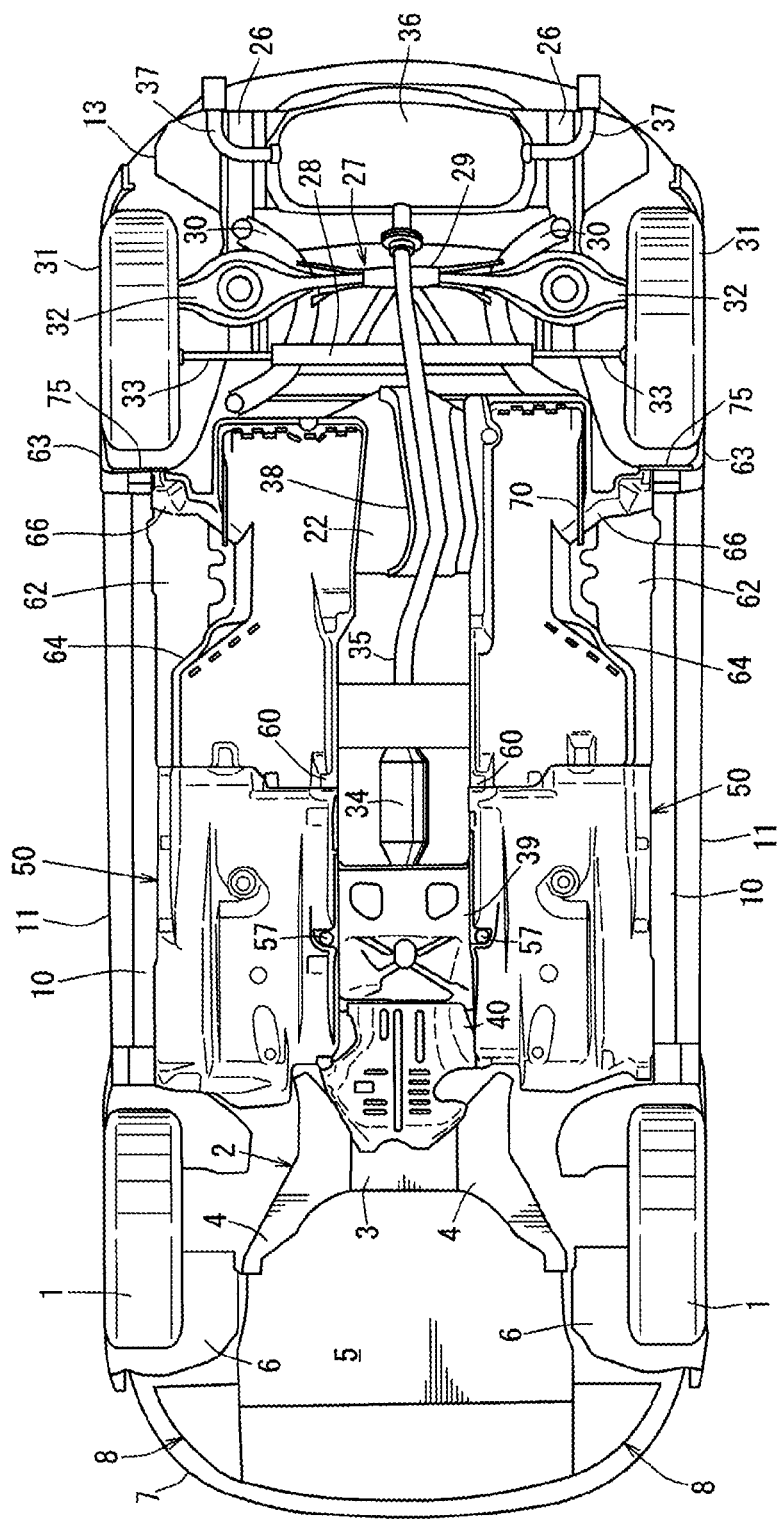
FIG. 1 is a bottom view of an automotive vehicle which is provided with an airflow straightening structure of the present invention.

Hereafter, an embodiment of the present invention will be described specifically referring to the accompanying drawings. The drawings show the airflow straightening structure of the automotive vehicle, and FIG. 1 is a bottom view of the automotive vehicle which is provided with the present airflow straightening structure. A vehicle-body structure will be described referring to FIG. 1 first before describing the airflow straightening structure of the automotive vehicle specifically.

As shown in FIG. 1, in an engine room are provided an engine and a sub frame 2 which supports a front suspension so as to suspend front wheels 1. The sub frame 2 comprises a front cross member (not illustrated) which extends in a vehicle width direction at a front portion, a rear cross member 3 which extends in the vehicle width direction at a rear portion, and right-and-left side members 4, 4 which extend in a vehicle longitudinal direction.

As shown in FIG. 1, a lower portion of the engine room is covered with a front under cover 5, and a deflector 8 is provided in an area which is of a substantially triangular shape in a bottom view, which is enclosed by a lower end portion of a splash shield (a so-called mudguard member) 6 for the front wheel 1, a side end portion of the front under cover 5, and a side portion of a front bumper 7, that is—at an underfloor positioned in front of the front wheel 1.

Side sills 10 which extend in the vehicle longitudinal direction and have a closed cross section respectively are provided at right-and-left both side portions of a floor panel 9 (see FIG. 5) as shown in FIG. 1, and at least an outward-side portion, in the vehicle width direction, of the side sill 10 is covered with an under-door garnish 11 which extends in the vehicle longitudinal direction.

Figure 5:
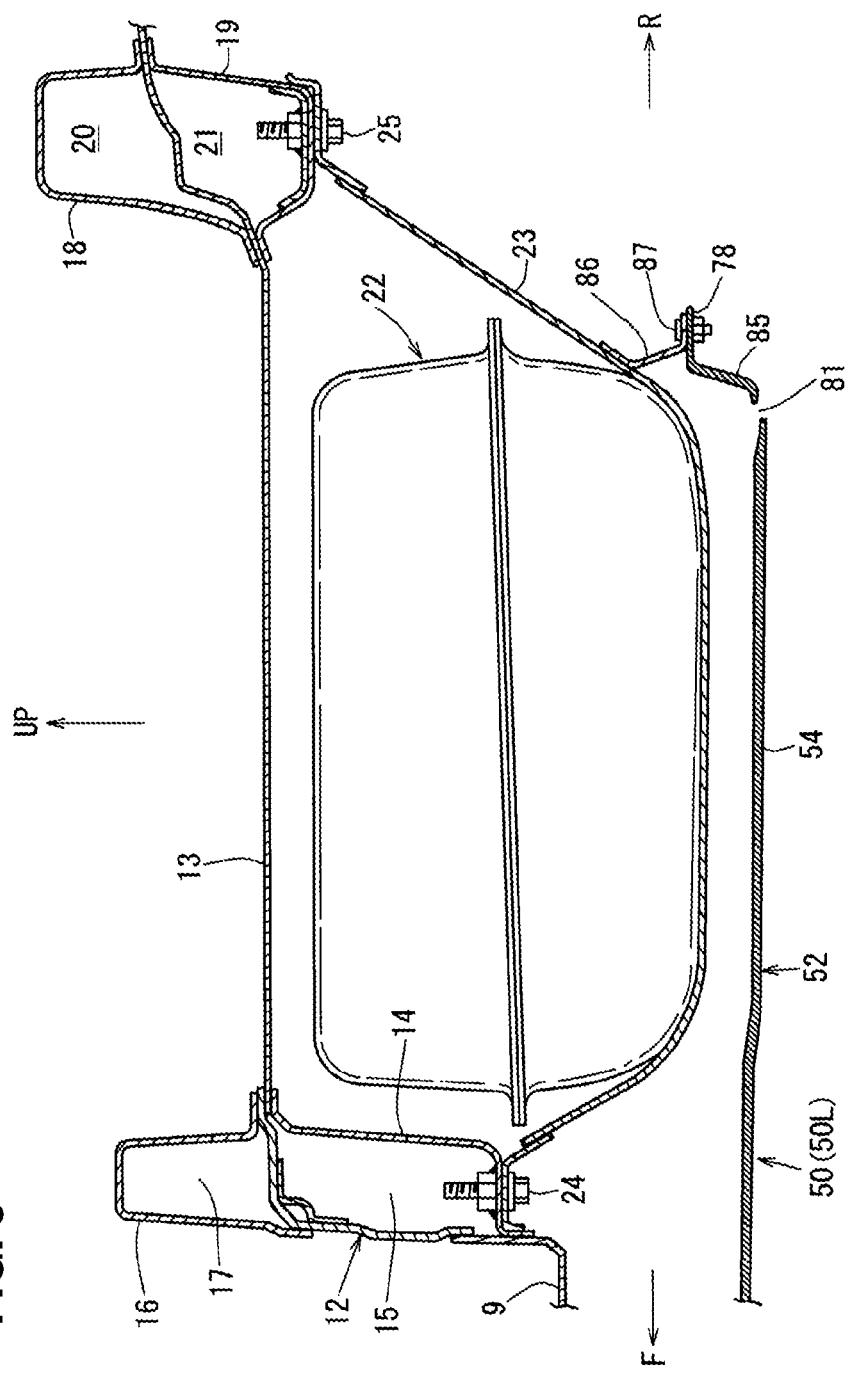
FIG. 5 is an enlarged sectional view of a major part taken along line A-A of FIG. 3.

As shown in FIG. 5 (the enlarged sectional view of the major part taken along line A-A of FIG. 3, which will be described later), a rear floor 13 (part of the floor panel) which extends rearward continuously from a rear portion of the floor panel 9 via a kick-up portion 12 which rises upward is provided in back of the floor panel 9. Further, a cross member 14 (a so-called No. 3 cross member) which extends in the vehicle width direction is attached between a back face (rear-side face) of the kick-up portion 12 and a front lower face of the rear floor 13, and a closed cross section 15 which extends in the vehicle width direction is formed among the kick-up portion 12, the rear floor 13, and the cross member 14. Moreover, a cross member upper 16 is attached to an upper face of the kick-up portion 12, and a closed cross section 17 which extends in the vehicle width direction is formed between the cross member upper 16 and the upper face of the kick-up portion 12.

As shown in FIG. 5, to upper-and-lower sides of a portion of the rear floor 13 which is spaced rearward apart from the cross member lower 14 and the cross member upper 16 are attached a rear cross member upper 18 and a rear cross member lower 19 such that these members 18, 19 face each other vertically.

Further, closed cross sections 20, 21 which extend in the vehicle width direction are formed between the rear cross member upper 18 and the rear floor 13 and between the rear cross member lower 19 and the rear floor 13.

As show in FIG. 5 as well, a fuel tank 22 is arranged below a portion of the rear floor 13 which is positioned between the cross member lower 14 (No. 3 cross member) and the rear cross member 19 (No. 4 cross member). The fuel tank 22 is supported at a pair of right-and-left tank fixation bands 23, 23 (only one of the tank fixation bands is illustrated in the drawings), and a front end portion of the tank fixation band 23 is fixed to the cross member lower 14 by an attaching member 24, such as bolt and nut, and a rear end portion of the tank fixation band 23 is fixed to the rear cross member lower 19 by an attaching member 25, such as bolt and nut.

Meanwhile, as shown in FIG. 1, a rear sub frame 27 for attaching a rear suspension device is supported, via plural bushes, at rear side frames 26 which are fixedly joined to respective lower portions of right-and-left both sides of the rear floor 13 and have respective closed cross sections extending in the vehicle longitudinal direction. The sub frame 27 comprises a front cross member 28, a rear cross member 29, and a pair of right-and-left side members 30, 30 which extend substantially in the vehicle longitudinal direction, which are combined substantially in a parallel cross shape in the bottom view.

Further, as shown in FIG. 1, a lower arm 32 is provided between a knuckle of the rear wheel 31 and the rear cross member 29, a toe control link 33 is provided between the knuckle and the front cross member 28, a trailing arm (not illustrated) is provided between the knuckle and a vehicle body positioned in front of the knuckle, and a damper (a so-called strut damper) is provided between the knuckle and a damper attachment portion of a rear wheel house, which constitute the rear suspension device.

Herein, exhaust-system components are coupled to the engine which is provided in front of a dash lower panel which partitions the engine room from a cabin in the vehicle longitudinal direction. As shown in FIG. 1, the exhaust-system components of the engine comprise an exhaust pipe 35 which is provided with a catalyst 34 as an exhaust-gas purifier, a silencer 36 as a muffler which is coupled to a downstream end of the exhaust pipe 35, and tail pipes 37, 37 which are coupled to right-and-left both sides of the silencer 36. As shown in FIG. 1, the above-described exhaust pipe 35 extends rearward, passing through a vehicle outward side, i.e., a downward side, of a tunnel portion and extends further rearward, passing below the fuel tank 22.

As shown in FIG. 1, an insulator 38 is arranged between an upper portion of the exhaust pipe 35 and a lower portion of the fuel tank 22. Further, a tunnel brace 39 is provided at a position corresponding to a front portion of the catalyst 34 as shown in FIG. 1. The tunnel brace 39 interconnects, in the vehicle width direction, a pair of right-and-left tunnel members which are respectively vehicle-body rigidity members positioned below the tunnel portion, and a under-tunnel cover 40 is provided in front of and below the tunnel brace 39.

Figure 2:
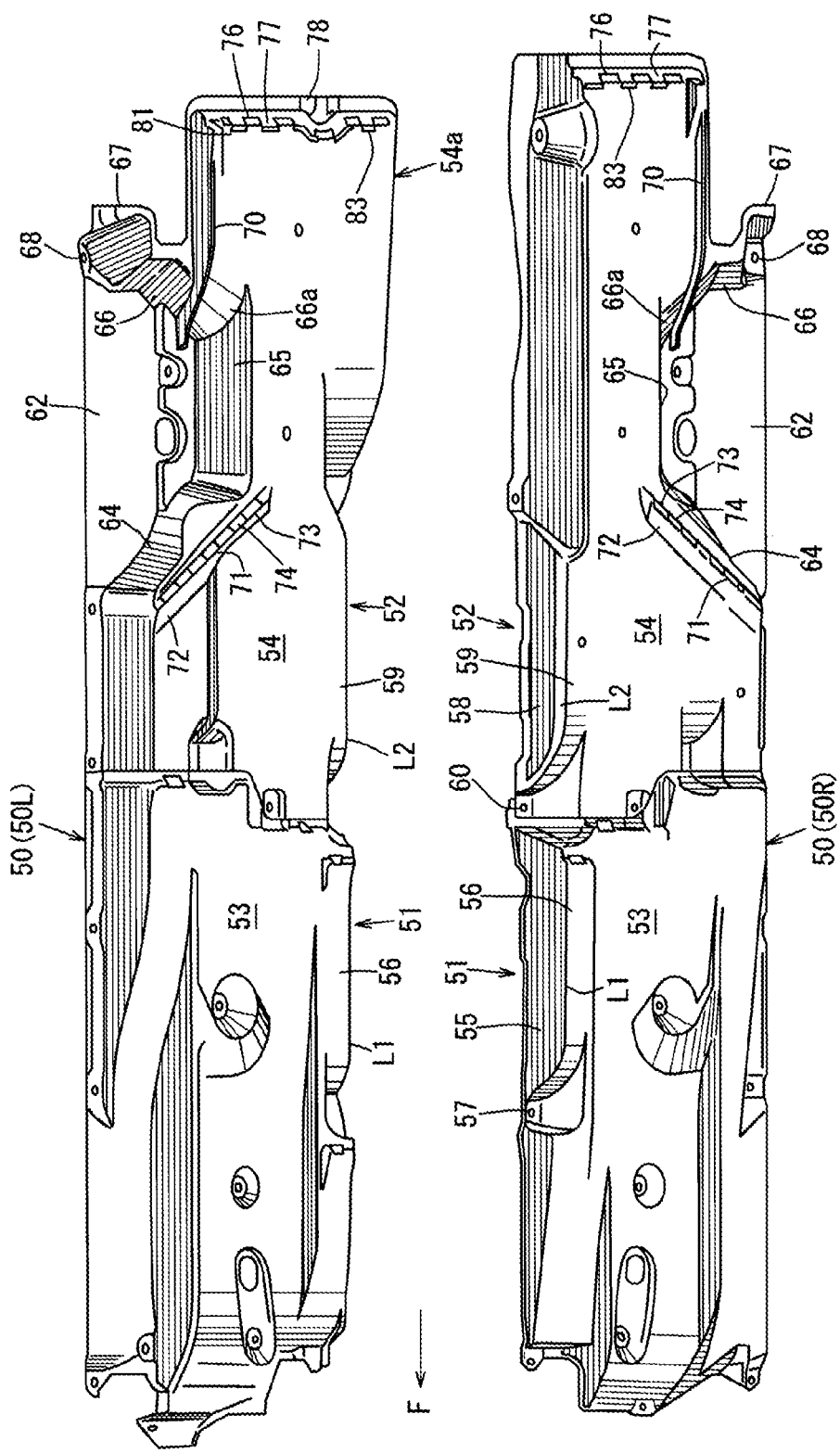
FIG. 2 is a perspective view of an under cover as an example of a cover, when viewed from a vehicle downward side.
Figure 3:
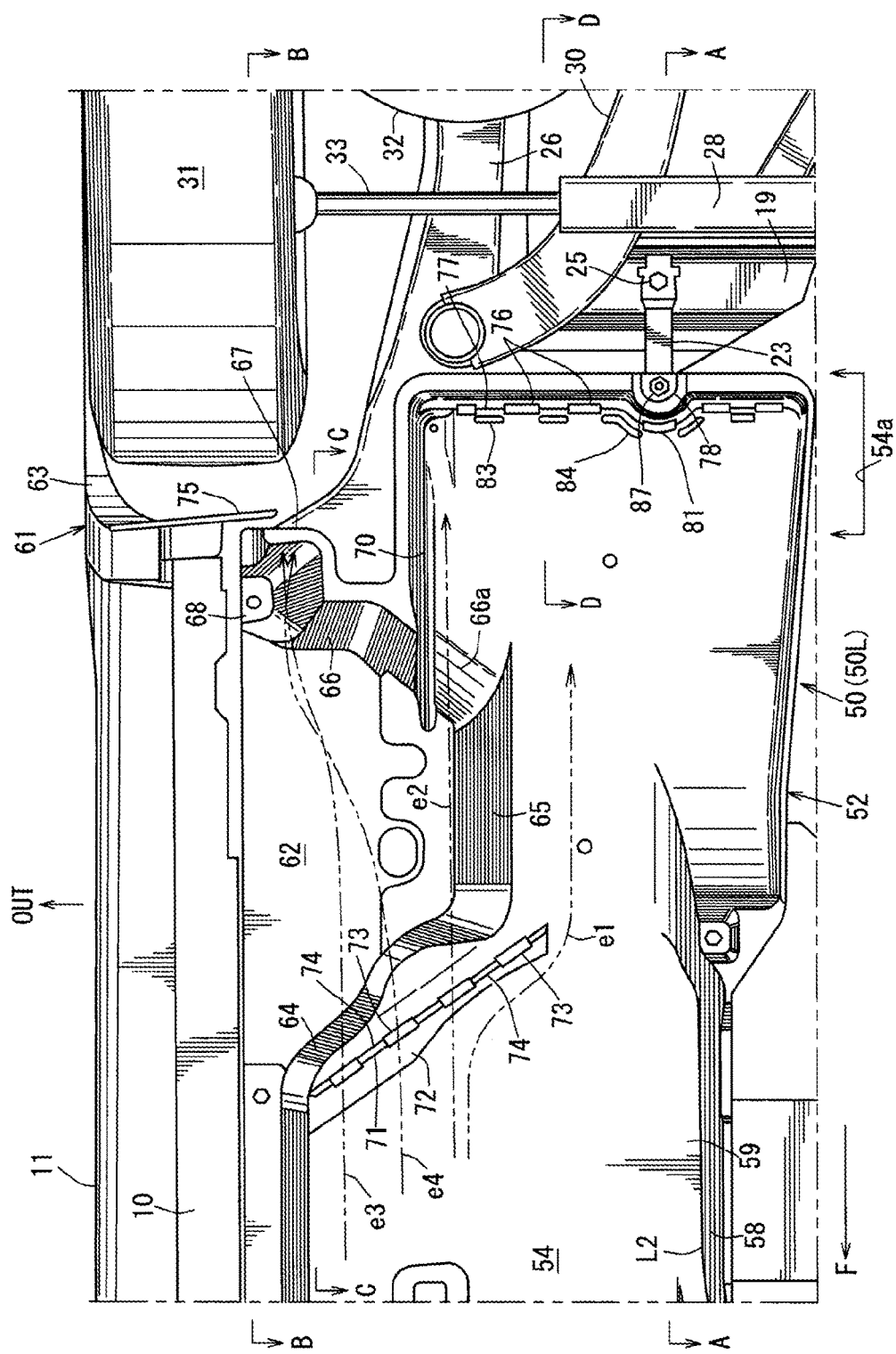
FIG. 3 is a major-part enlarged view of FIG. 1.
Figure 4:
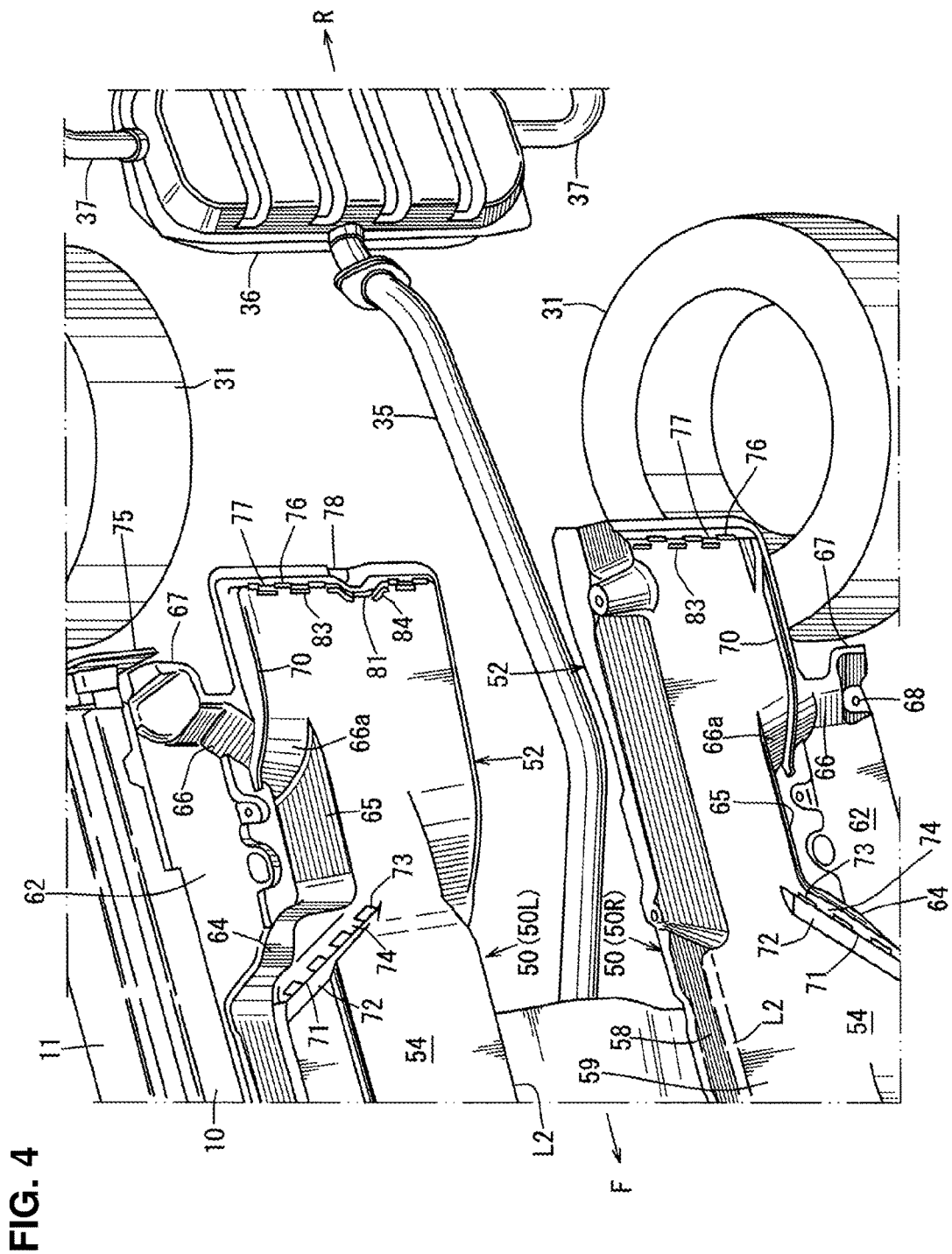
FIG. 4 is a perspective view of the airflow straightening structure of the automotive vehicle, when viewed from the vehicle downward side.
Figure 6:
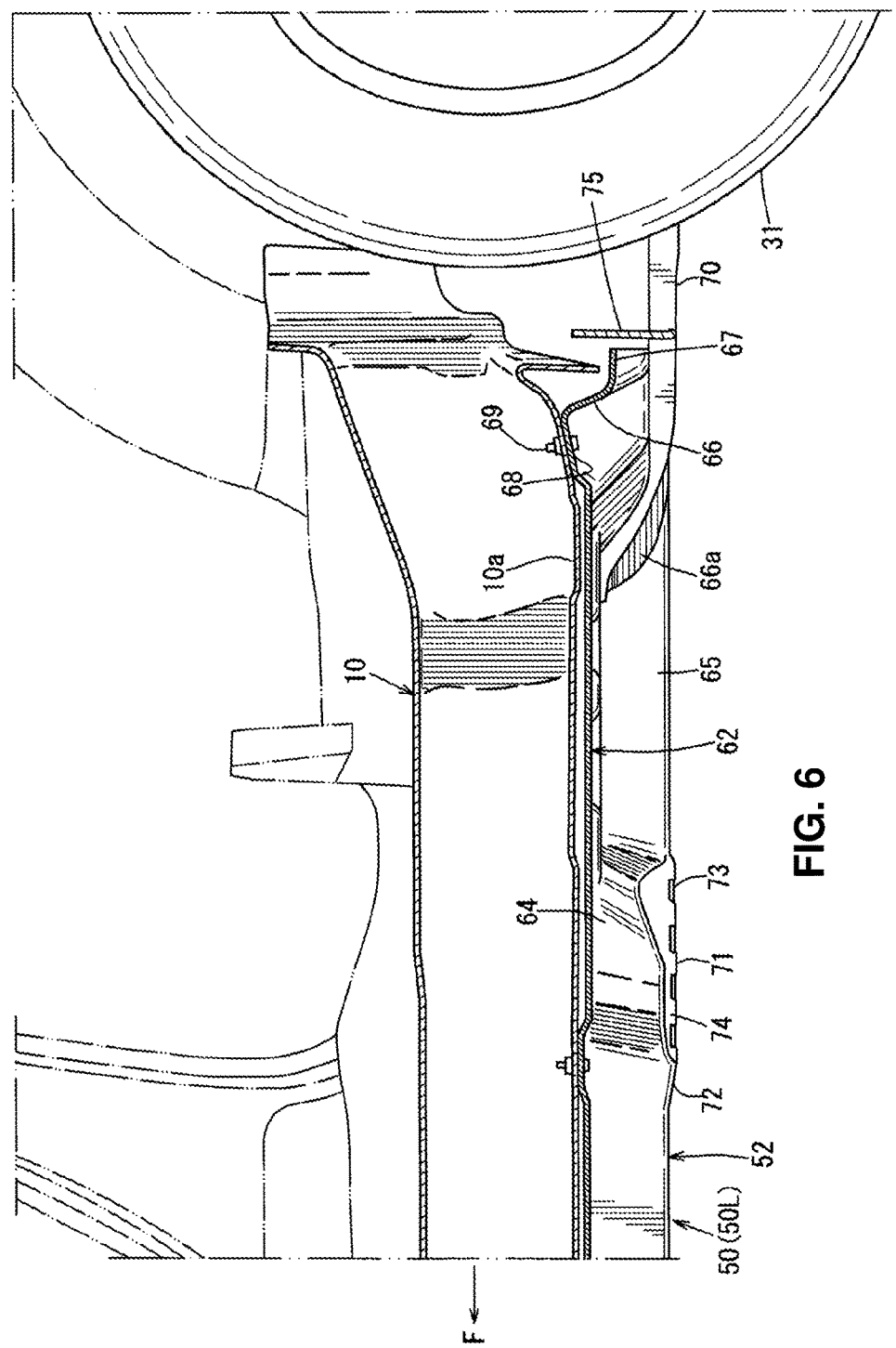
FIG. 6 is a sectional view of the major part taken along line B-B of FIG. 3.
Figure 7:
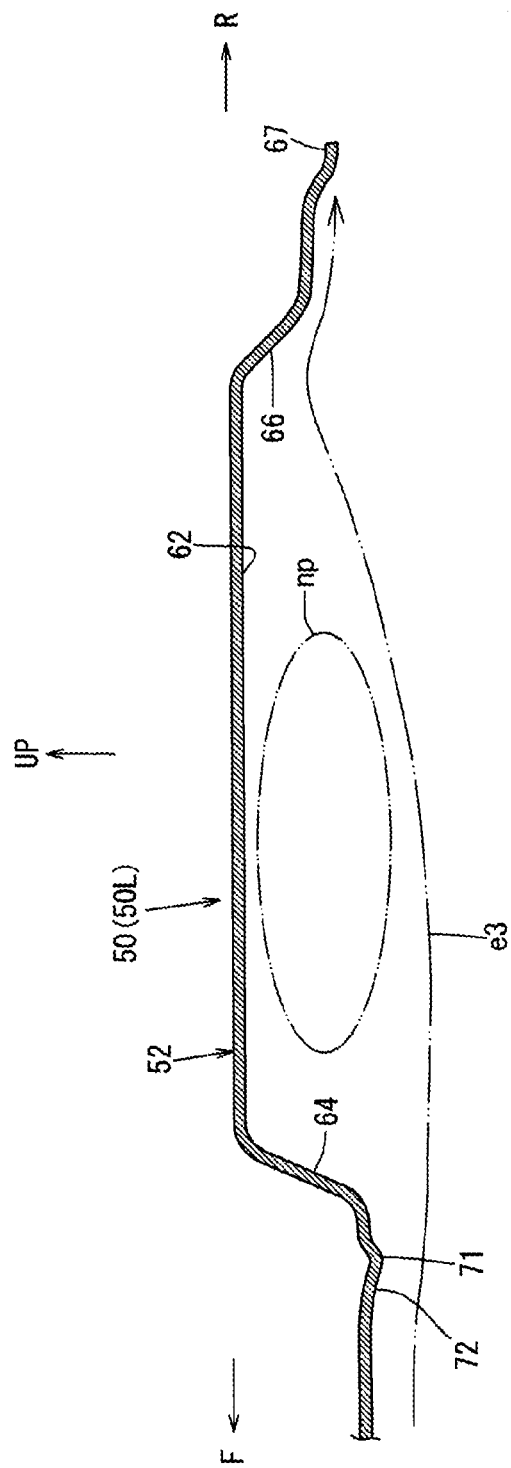
FIG. 7 is a sectional view of the under cover taken along line C-C of FIG. 3.
Figure 8:
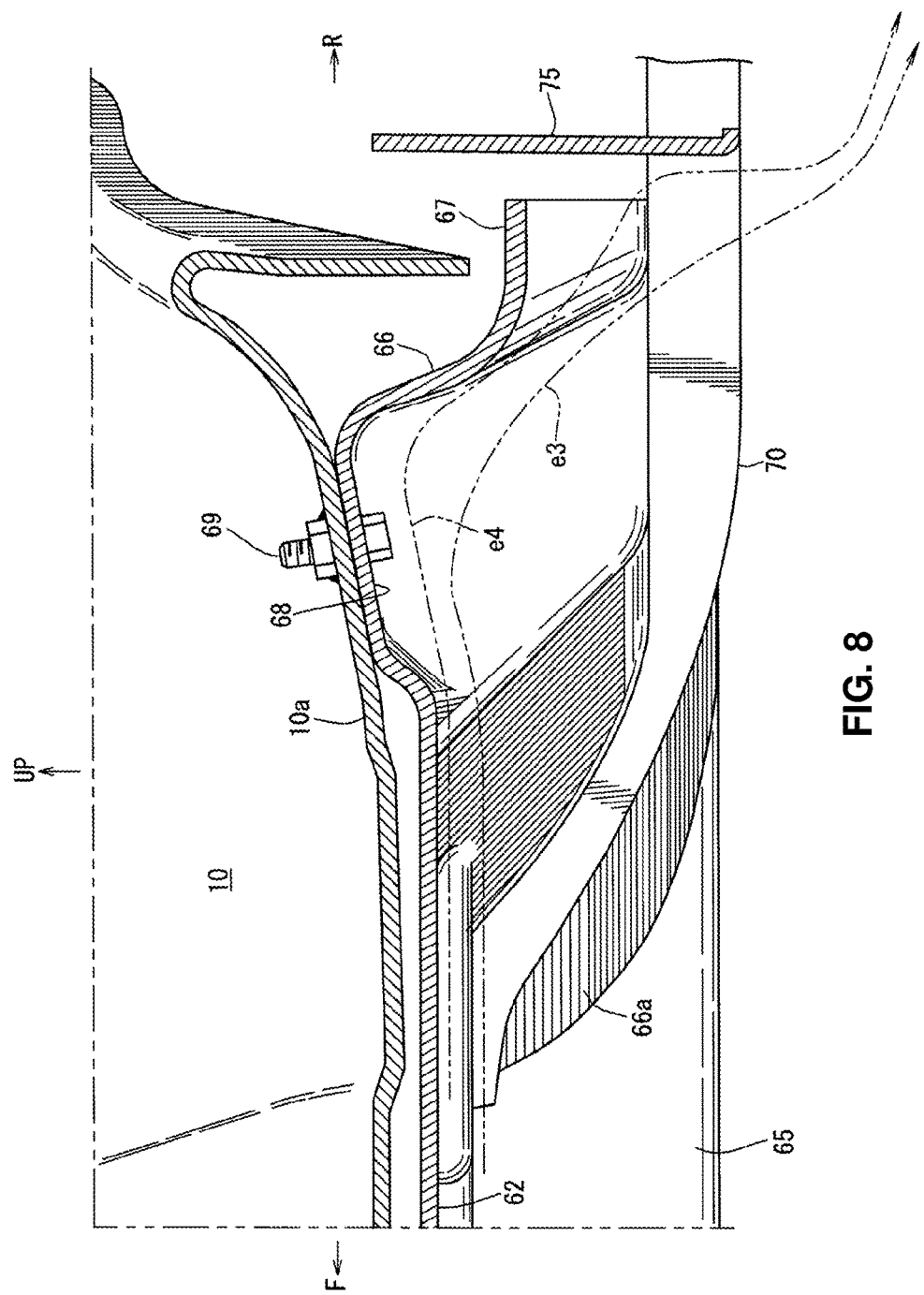
FIG. 8 is a major-part enlarged view of FIG. 6.

FIG. 2 is a perspective view of the floor under cover as an underfloor member, when viewed from a vehicle downward side, FIG. 3 is a major-part enlarged view of FIG. 1, FIG. 4 is a perspective view of the airflow straightening structure of the automotive vehicle, when viewed from the vehicle downward side, FIG. 5 is an enlarged sectional view of a major part taken along line A-A of FIG. 3, FIG. 6 is a sectional view of the major part taken along line B-B of FIG. 3, FIG. 7 is a sectional view of the floor under cover taken along line C-C of FIG. 3, and FIG. 8 is a major-part enlarged view of FIG. 6.

Hereafter, the airflow straightening structure of the automotive vehicle will be described. In the following embodiment, an under cover is used as an example of an aero dynamical cover and this embodiment exemplifies a lower-part airflow straightening structure for straightening traveling air flowing at the underfloor.

As shown in FIG. 1, floor under covers 50, 50 (hereafter, referred to as "under cover") as the underfloor member are provided on right-and-left both sides below the tunnel portion between the front wheel 1 and the rear wheel 31.

FIG. 2 is a bottom-face perspective view of the under covers 50, 50, where the under cover 50 shown on an upper side of FIG. 2 is a left-side under cover 50L and the other under cover 50 shown on a downward side of FIG. 2 is the right-side one 50R. These under covers 50L, 50R are configured to be substantially symmetrical.

As shown in FIG. 1, the under covers 50, 50 cover the floor face (see the floor panel 9) of the vehicle body, excluding the tunnel portion, each of which comprises two members of a front-side member 51 and a rear-side member 52 which are integrated in the vehicle longitudinal direction as shown in FIG. 2 in the present embodiment.

Further, in the present embodiment, a main part of the above-described under cover 50 is made of a nonwoven fabric. Specifically, that is formed by pressing and hardening layers of a material which is made by impregnating the nonwoven fabric with resin as a binder and a rubber sheet and/or a resin sheet. Thus, according to the present embodiment, since the main part of the under cover 50 is made of the nonwoven fabric containing fiber, by utilizing the material (nonwoven fabric) which has the poor formability of a corner portion, thereby showing inferiority in making a traveling-air peeling off (separation) portion, the superior airflow straightening performance can be secured with the superior lightweight property, the high sound absorbing performance, and the high rigidity strength. Thus, the lightweight and silence properties are increased properly. Herein, any other material than the above-described nonwoven fabric, such as fiber reinforced resin of CFRP or GFRP or a woven fabric, is applicable.

As shown in FIG. 2, the under covers 50, 50 have floor faces 53, 54 as substantially flat airflow straightening faces extending in the vehicle longitudinal direction at the front-side member 51 and the rear-side member 52.

As shown in FIG. 2, a corner ridgeline L1 extending in the vehicle longitudinal direction is formed at a portion of each of the pair of right-and-left front-side members 51, 51 which faces the tunnel portion which is positioned between a side face 55 extending in the vehicle longitudinal direction and a lower face 56 extending in the vehicle longitudinal direction, and a recess-shaped vehicle-body attachment portion 57 which is recessed vehicle upward is provided at the corner ridgeline L1.

Likewise, a corner ridgeline L2 extending in the vehicle longitudinal direction is formed at a portion of each of the pair of right-and-left rear-side members 52, 52 which faces the tunnel portion which is positioned between a side face 58 extending in the vehicle longitudinal direction and a lower face 59 extending in the vehicle longitudinal direction, and a recess-shaped vehicle-body attachment portion 60 which is recessed vehicle upward is provided at the corner ridgeline L2 as well.

As shown in FIG. 3 which is an enlarged view of a major part of FIG. 1, a recess portion 62 is formed at a rear portion of the rear-side member 52 of the under cover 50 at a position just in front of the rear wheelhouse 61.

Herein, an arch molding 63 which covers a wheel arch which is formed by the rear wheelhouse 61 is illustrated in the drawings. Further, the above-described recess portion 62 is the one, which provides a jack-up point which may be necessary for manufacturing or maintenance of the automotive vehicle.

As shown in FIGS. 2, 3 and 4, the above-described recess portion 62 is configured to be recessed upward from the floor face 54 of the rear-side member 52, which includes a front wall 64, a side wall 65, and a rear wall 66.

As shown in FIGS. 2 and 3, the rear wall 66 is configured to extend outward and rearward stepwise such that its inward side is positioned at the vehicle forward side and its outward side is positioned at the vehicle rearward side, and as shown in FIGS. 4 and 6, the rear wall 66 is configured to extend downward and has a flange portion 67 extending rearward at its lower end.

As shown in FIGS. 3 and 6, an attachment portion 68 for attachment to the vehicle body is provided to be recessed at an outward end portion of the rear wall 66, and as shown in FIG. 6, this attachment portion 68 is attached to a bottom wall portion 10a of the side sill 10 by an attaching member 69, such as bolt and nut.

As shown in FIG. 3, a gentle slant portion 66a which is configured to be curved in an arc shape is formed at a portion of the rear wall 66 which is positioned near the side wall 65, and this gentle slant portion 66a makes the traveling air flowing at the underfloor properly smooth.

As shown in the same figure, on the outward side, in the vehicle width direction, of the above-described gentle slant portion 66a is provided a vertical wall 70 which is configured to protrude downward along the rear wall 66 of the recess portion 62 once and then straightly extend rearward along the floor face 54.

As shown in FIG. 3, the front wall 64 of the recess portion 62 is configured to extend obliquely inward and rearward at a position located in front of the rear wall 66. That is, the front wall 64 is configured to extend obliquely such that its outward side is positioned on the vehicle forward side and its inward side is positioned on the vehicle rearward side.

As shown in FIGS. 3 and 7, at a lower-face edge portion of the above-described front wall 64 is provided a guide portion 72 which includes an edge portion 71 for promotion of the underfloor-air peeling off (separation). As shown in FIG. 7, the guide portion 72 is a slant guide portion which slants rearward and downward, and as shown in FIG. 3, slits 73 and connection portions 74 are formed alternately along the edge portion 71.

As shown in FIGS. 3 and 6, a deflector 75 is provided at a rear end of the side sill 10. This deflector 75 is configured to cover a gap between an outward rear end of the rear-side member 52 of the under cover 50 and the side sill 10 and extend downward beyond the flange portion 67 up to substantially the same position as a lower side portion of the vertical wall 70 as shown in FIG. 6.

As shown in FIG. 3, the front wall 64 of the recess portion 62 extends obliquely inward and rearward in front of the rear wall 66 and the guide portion 72 having the edge portion 71 is provided at the lower face edge portion of the front wall 64, so that an excessive airflow e1 is removed inward, in the vehicle width direction, relatively to the recess portion 62 by the guide portion 72 of the front wall 64. Further, at a position which corresponds to an inward side, in the vehicle width direction, relatively to the vertical wall 70, an underfloor traveling airflow e2 which flows down from the vehicle forward side to the vehicle rearward side peels off at the edge portion 71 once and then contacts the gentle slant portion 66a again, and after the re-contact of the traveling air, the traveling air is guided by the vertical wall 70 so as not to flow down outward and then flows downward straightly.

An outward-side underfloor traveling airflow e3 which flows down from the vehicle forward side to the vehicle rearward side at the position corresponding to the recess portion 62 is made to peel off (separate) at the edge portion 71 of the guide portion 72, and a negative-pressure area np is generated between the peeling-off air and the recess portion 62 as shown in FIG. 7. An inward-side underfloor traveling airflow e4 which flows down from the vehicle forward side to the vehicle rearward side at the position corresponding to the recess portion 62 is drawn in toward the negative-pressure area, so that the outward-side underfloor traveling airflow e3 and the inward-side underfloor traveling airflow e4 are focused toward the outward side of the rear wall 66 of the recess portion 62.

This focusing strengthens moves of the underfloor traveling air and makes the inward-side underfloor traveling airflow e4 contact the rear wall 66 again, so that as shown in FIG. 8, these underfloor traveling airflows e3, e4 are made to effectively peel off downward at the position where the rear wall 66 of the recess portion 62 extends downward and prevented from flowing into the rear wheelhouse 61. Further, since the outward-side underfloor traveling airflow e3 and the inward-side underfloor traveling airflow e4 are focused toward the outward side of the rear wall 66 of the recess portion 62, the vehicle-body side-face flow is prevented from flowing into the recess portion 62.

To sum up, by focusing the underfloor traveling airflows e3, e4 at the recess portion 62 positioned in front of the rear wheelhouse 6, the move of the underfloor traveling airflows e3, e4 is strengthened, and by making the underfloor traveling airflows e3, e4 effectively peel off (separate) at the position where the rear wall 66 of the recess portion 62 extends downward, the underfloor traveling airflows e3, e4 are prevented from flowing into the rear wheelhouse 61. Thus, through this focusing effect of the underfloor traveling air, the traveling air is made to peel off surely by guiding the focused underfloor traveling airflows e3, e4 downward even at the under cover 50 where it is uneasy to form a sharp edge. In FIG. 3, illustration of an imaginary-line arrow which shows the inward underfloor traveling airflow e4 is emphasized.

Herein, as shown in FIG. 3, an over-half part, in the vehicle width direction, of a rear portion of the rear-side member 52 of the under cover 50 is configured to extend rearward beyond the recess portion 62, whereby a substantially flat lower face (see the floor face 54) is enlarged and a rearward extension portion 54a of the floor face 54 is formed.

Figure 9:
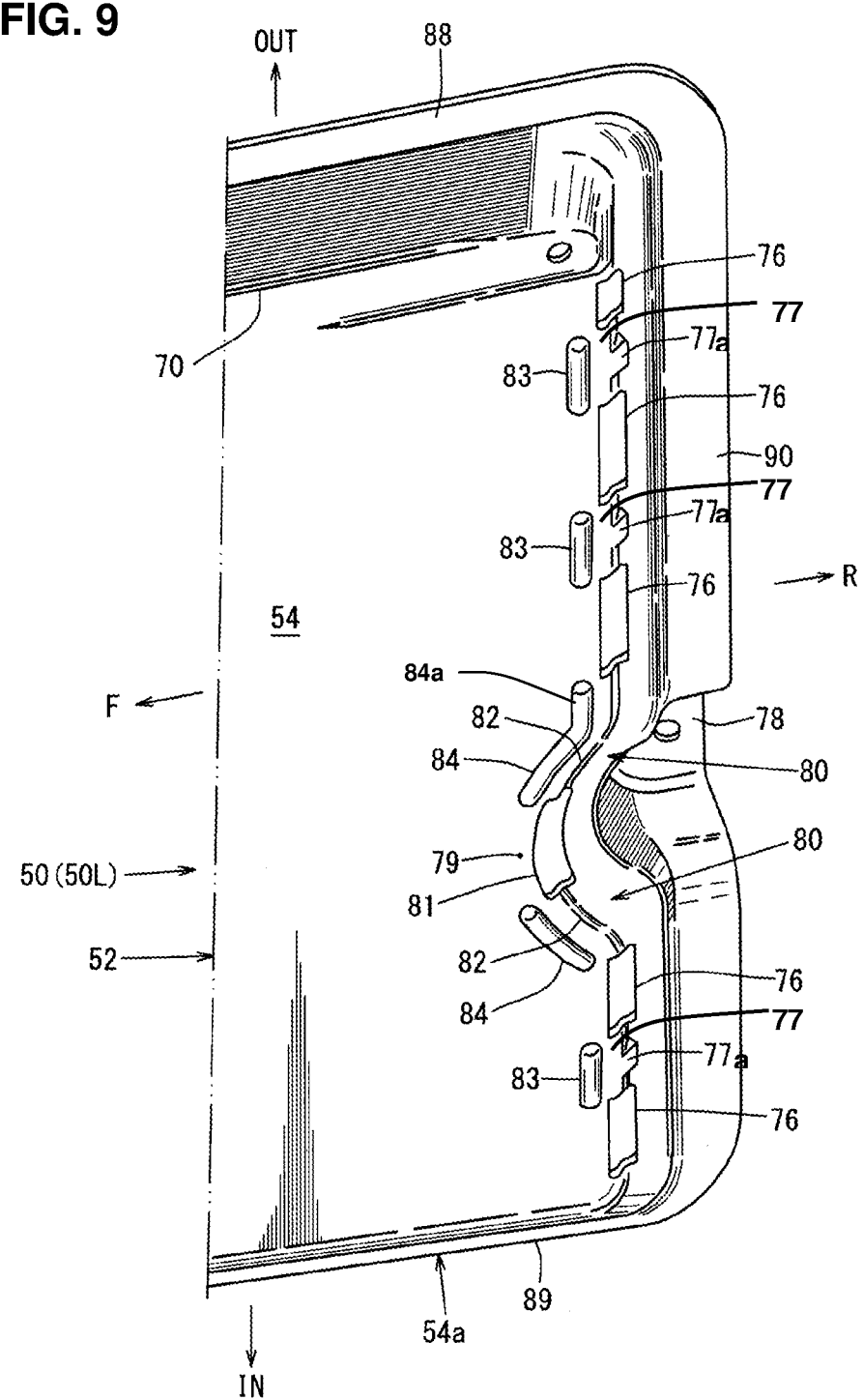
FIG. 9 is an enlarged perspective view of the airflow straightening structure of the automotive vehicle of the present invention, when viewed from the vehicle downward side.
Figure 10:
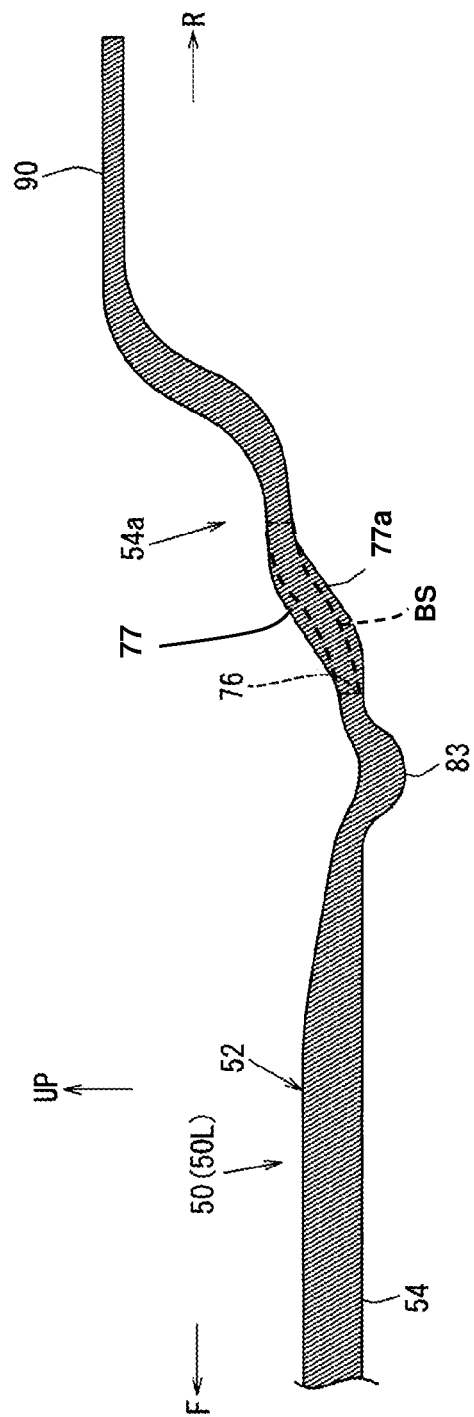
FIG. 10 is an enlarged sectional view of a major part taken along line D-D of FIG. 3.
Figure 11:
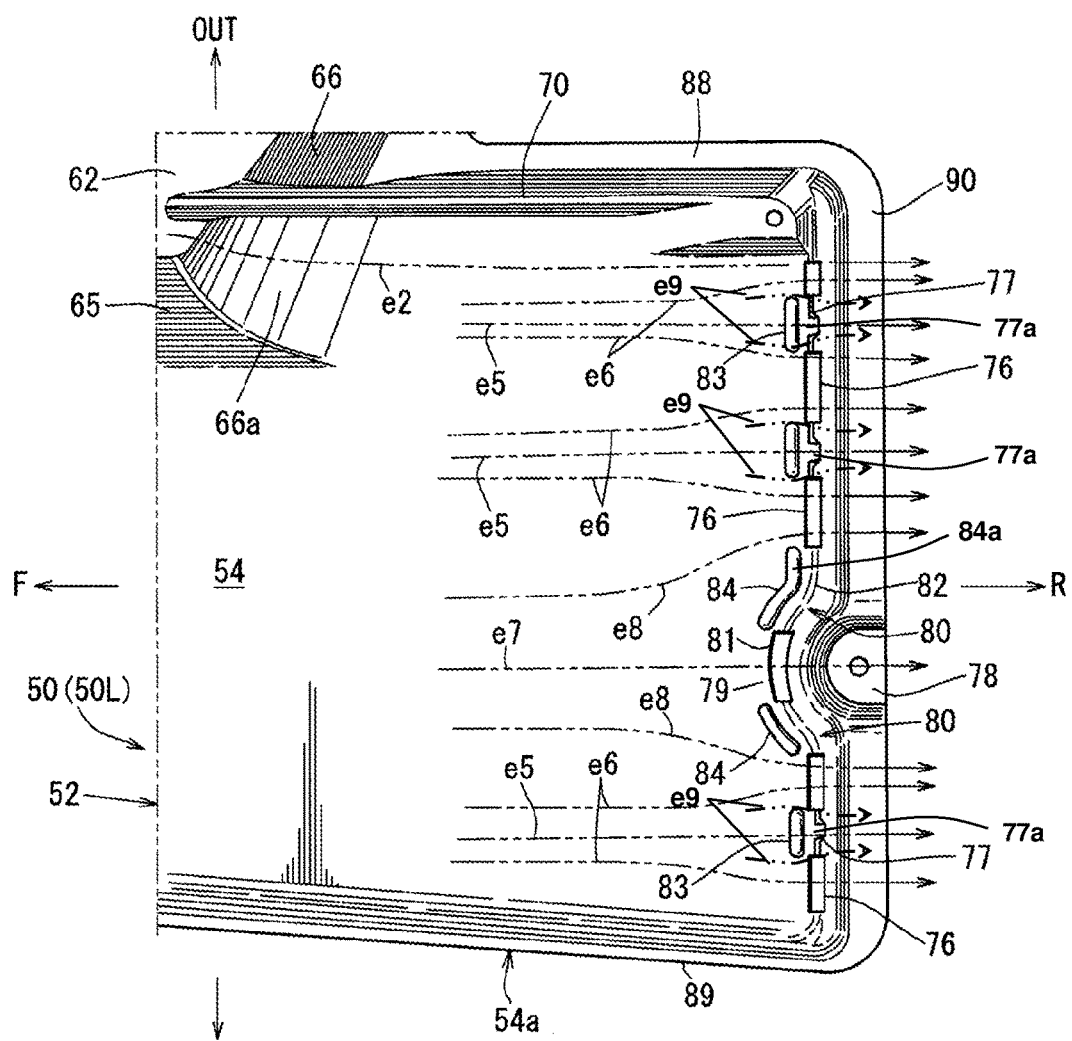
FIG. 11 is an enlarged bottom view of the airflow straightening structure of the automotive vehicle.

FIG. 9 is an enlarged perspective view of the rearward extension portion 54a of the floor face 54, when viewed from the vehicle downward side, FIG. 10 is an enlarged sectional view of a major part taken along line D-D of FIG. 3, and FIG. 11 is an enlarged bottom view of the airflow straightening structure of the automotive vehicle, that is, the enlarged bottom view of the structure of FIG. 9, when viewed from the vehicle downward side.

As shown in FIGS. 9 and 11, plural slits 76 for traveling-air peeling off (separation) and plural connection portions 77 for cover reinforcing are adjacently provided alternately at a rear-end edge portion of the above-described rearward extension portion 54a of the under cover 50 which is an example of the cover. These plural slits 76 and connection portions 77 are aligned substantially in the vehicle width direction linearly.

Herein, a portion of the rear-end edge portion of the rearward extension portion 54a of the under cover 50 which corresponds to an attachment portion 78 of the under cover 50 to be attached to a vehicle-body side includes an extension portion 79 which extends substantially linearly along the vehicle width direction and slant portions 80 which respectively extend obliquely relatively to the vehicle longitudinal direction and the vehicle width direction, wherein the extension portion 79 and the slant portions 80 are provided adjacently. A slit 81 for traveling-air peeling off (separation) is formed at the above-described extension portion 79 and connection portions 82 for reinforcing are formed at the above-described slant portions 80.

As shown in FIGS. 9 and 10, protrusions 83, 84 for traveling-air peeling off (separation) are provided to respectively extend in directions crossing the vehicle longitudinal direction along a cover surface of the under cover 50, which are positioned in front of the above-described connection portions 77, 82. The above-described protrusions 84 extend along the slant portions 80.

In the preset embodiment, beads which protrude downward are used as the above-descried protrusions 83, 84, and each length of the directions crossing the vehicle longitudinal direction of the protrusions 83, 84 is set to be substantially equal to or longer than each length of the directions crossing the vehicle longitudinal direction of the connection portions 77, 82. The respective protrusions 83, 84 are configured to extend from respective end portions, in the vehicle width direction, of the connection portions 77, 82 to respective opening-inward edges of the slits 76, 81 adjacent to the protrusions 83, 84.

As shown in FIG. 5, the above-described attachment portion 78 is integrally formed at a rear end of the floor face 54 via a rear vertical wall 85 at a central portion, in the vehicle width direction, of the rearward extension portion 54a. The attachment portion 78 is attached to a lower end of a bracket 86 which is previously attached to a tank fixing band 23 by an attaching member 87, such as bolt and nut, as shown in the same figure.

Thus, the under cover 50 is attached to the vehicle-body side by utilizing the tank fixing band 23 without adopting a structure where a stay is provided to extend from the vehicle-body side, so that the under cover 50 can be expanded up to a position just in front of a complex mechanism, such as a rear suspension device, without adding any additional attaching member.

Further, as shown in FIGS. 9, 10 and 11, flange portions 88, 89, 90 are integrally formed at an outward end portion, an inward end portion, and a rearward end portion of the rearward extension portion 54a, thereby increasing the rigidity of the under cover 50. Since the protrusions 83 are provided to extend in the direction crossing the vehicle longitudinal direction along the cover surface of the under cover 50, which are positioned in front of the connection portions 77, in the airflow straightening structure in which the slits 76 and the connection portions 77 are adjacently provided in the direction crossing the vehicle longitudinal direction as described above, the following operations/effects are provided.

That is, as shown in the bottom view of FIG. 11, an underfloor traveling airflow e5 which flows down from the vehicle forward side to the vehicle rearward side at a position corresponding to a central portion, in the vehicle width direction, of the protrusion 83 is made to peel off at the protrusion 83, and then flows rearward straightly.

Moreover, underfloor traveling airflows e6 which flow down from the vehicle forward side to the vehicle rearward side at positions corresponding to both end portions, in the vehicle width direction, of the protrusion 83 are guided toward the slits 76 by the end portions of the protrusion 83 and made to peel off at the slits 76, then flow rearward straightly.

Accordingly, the traveling-air peeling off performance is improved by the above-described protrusion 83 even at the position of the connection portion 77, ensuring the cover rigidity by means of the protrusion 83, and improving of the traveling-air peeling off performance is further achieved by the protrusion 83 guiding the traveling air to the slit 76 having the high traveling-air peeling off performance.

Further, since the extension portion 79 and the slant portions 80 are provided adjacently at the portion of the under cover 50 which corresponds to the attachment portion 78, and the slit 81 is formed at the extension portion 79 and the connection portions 82 and the protrusions 84 are formed at the slant portions 80, the following operations/effects are provided.

That is, as shown in FIG. 11, an underfloor traveling airflow e7 which flows down from the vehicle forward side to the vehicle rearward side at a position corresponding to the slit 81 is made to peel off at the slit 81, and then flows rearward straightly. Also, underfloor traveling airflows e8 which flow down from the vehicle forward side to the vehicle rearward side at positions corresponding to the protrusions 84 are guided toward the slits 76 or the slit 81 by the end portions of the protrusions 84 and made to peel off at the slits 76, 81, then flow rearward straightly.

The rigidity improvement of the under cover 50 can be achieved by the protrusions 84, reducing an aerodynamic-characteristic length of the protrusions 84 formed at the slant portions 80, when viewed from the vehicle longitudinal direction. Also, the guiding effect of the protrusions 84 and the traveling-air peeling off (separation) effect of the slit 81 can be provided compatibly. Herein, in the figures, an arrow F shows the vehicle forward side, an arrow R shows the vehicle rearward side, an arrow IN shows the inward side in the vehicle width direction, an arrow OUT shows the outward side in the vehicle width direction, and an arrow UP shows the vehicle upward side.

As described above, the airflow straightening structure of the automotive vehicle of the present embodiment, in which the slits 76, 81 for the traveling-air peeling off (separation) and the connection portions 77, 82 for cover reinforcing are adjacently provided at the rear-end edge portion of the cover (see the under cover 50) having the substantially-flat airflow straightening face (see the floor face 54) extending in the vehicle longitudinal direction, wherein the protrusions 83, 84 are provided to extend in the direction crossing the vehicle longitudinal direction along the cover surface, which are positioned in front of the connection portions 77, 82 (see FIGS. 9 and 11).

According to the present invention, the cover (the under cover 50) can be reinforced by the protrusions 83, 84, and therefore the rigidity of the cover (the under over 50) is so increased that the width of the connection portions 77, 82 can be narrower (the length, in the vehicle width direction, of these connection portions can be shorter in the present embodiment). Thereby, the width of the slits 76, 81 is made wider (the length, in the vehicle width direction, of these slits is made longer in the present embodiment), so that the traveling-air peeling off (separation) performance of the slits 76, 81 can be improved. Further, since the traveling air can be guided to the slits 76, 81 by the end portions of the protrusions 83, 84, the traveling-air peeling off (separation) performance can be further improved. That is, the slits 76, 81 can be enlarged by providing the protrusions 83, 84 and the traveling air is so guided to the slits 76, 81 by the protrusions 83, 84 that the traveling-air peeling off (separation) performance can be improved. Moreover, the traveling-air peeling off (separation) performance can be improved by the protrusions themselves, so that flowing of the traveling air toward the connection portion can be suppressed.

To sum up, improving of the traveling-air peeling off (separation) performance even at the position of the connection portions 77, 82 can be achieved by the protrusions 83, 84, securing the rigidity of the cover, and further improving of the traveling-air peeling off (separation) performance by guiding the traveling air to the slits 76, 81 having the high traveling-air peeling off performance can be achieved.

Further, the plural slits 76 of the present embodiment are aligned substantially in the vehicle width direction at the rear-end edge portion of the cover (the under cover 50), and the plural connection portions 77 are formed as non-slit forming portions which are respectively positioned between the adjacent slits 76 at the rear-end edge portion of the cover (the under cover 50). According to this structure, the above-described effects can be provided properly.

Also, in the present embodiment, the rear-end edge portion of the cover (the under cover 50) includes the extension portion 79 which extends substantially linearly along the vehicle width direction and a pair of slant portions 80 which extend obliquely relatively to the vehicle longitudinal direction and the vehicle width direction, the extension portion 79 and the pair of slant portions 80 being provided adjacently, and the slit 81 is formed at the extension portion 79 and the pair of connection portions 82 and the protrusions 84 are formed at the slant portions 80 (see FIGS. 9 and 11).

According to this structure, the guiding effect of the traveling air by the protrusions 84 can be secured, and also the slant portions 80 extend so obliquely that the cover (the under cover 50) can be reinforced by the protrusions 84, reducing the aerodynamic-characteristic width of the connection portions 82 and the protrusions 84 which are formed at the slant portions 80, when viewed from the vehicle longitudinal direction. In other words, the air guiding effect by means of the protrusions 84 and the traveling-air peeling off (separation) effect by means of the slit 81 can be optimized at a high level.

Further, in the present embodiment, the rear end of the under cover 50 is attached to the vehicle-body member (see the bracket 86 attached to the fixing band 23) via the attachment portion 78, the extension portion 79 is positioned substantially just in front of the attachment portion 78 of the under cover 50, and a pair of right-and-left slant portions 80 respectively extend obliquely rearward and laterally from the right-and-left end portions of the extension portion 79 such that the pair of slant portions 80 are positioned substantially obliquely in front of the attachment portion 78.

According to this structure, even at the attachment portion 78 where the slit, the connection portion, and the protrusion are unable to be aligned substantially in the vehicle width direction, these portions are arranged so properly that the reinforcing effect of the connection portions 82, the air guiding effect of the protrusions 84, and the traveling-air peeling off (separation) effect of the slit 81 can be provided properly.

Moreover, in the present embodiment, the protrusions 84 formed at the slant portions 80 integrally includes the extending protrusion portions 84a which extend substantially in the vehicle width direction continuously from the protrusions 84 (see FIGS. 9 and 11)

According to this structure, even in a case where there exists a gap between the protrusion 84 and the slit 76 which are formed at the slant port 80, the airflow which may flow down through this gap can be blocked and guided toward the slit 76 by the extending protrusion portion 84a of the protrusion 84 which are configured to extend substantially in the vehicle width direction continuously from the protrusion 84 (see the underfloor traveling airflow e8). Thereby, the traveling-air peeling off (separation) effect of the slit 76 can be enhanced.

Further, in the present embodiment, the length of the direction crossing the vehicle longitudinal direction of the protrusions 83, 84 is set to be substantially equal to or longer than the length of the direction crossing the vehicle longitudinal direction of the connection portions 77, 82 (see FIG. 11).

According to this structure, since the length of the direction crossing the vehicle longitudinal direction of the protrusions 83, 84 is set as described above, the traveling air can be surely guided to the slits 76, 81, thereby further improving the traveling-air peeling off (separation) performance.

Also, the cover (the under cover 50) of the present invention may be made of fiber reinforced resin or a nonwoven fabric or woven fabric.

Accordingly, lightweight and high rigidity and damping properties of the structure comprising the fiber-reinforced-resin made cover or the nonwoven-fabric or woven-fabric made cover can be attained as well.

Additionally, in the present embodiment, the connection portion 77 provided at the rear-end edge portion of the cover (the under cover 50) is configured such that a basic cross sectional portion BS of the connection portion 77 is of a crank shape and a thick portion 77a which is thicker than the basic cross sectional portion BS is provided at a central portion, in a vehicle width direction, of the connection portion 77 (see FIGS. 9, 10 and 11).

According to this structure, the traveling air which flows down through a gap between the slit 76 and the protrusion 83 positioned in front of the connection portion 77 (see an underfloor traveling airflow e9 of FIG. 11) can be made to effectively peel off (separate) by both-side portions of the connection portion 77 which have the crank-shaped basic cross section BS, and also the whole rigidity of the connection portion 77 can be properly increased by the thick portion 77a provided at the central portion of the connection portion 77. Thereby, the traveling-air peeling off (separation) and the cover reinforcing can be compatibly attained.

In correspondence of the present invention to the above-described embodiment, the cover corresponds to the under cover 50. Likewise, the airflow straightening face corresponds to the floor face 54. However, the present invention should not be limited to the above-described embodiment and any other modifications or improvements may be applied within the scope of a spirit of the present invention.

For example, while the lower airflow straightening structure is exemplified as the airflow straightening structure of the automotive vehicle in the above-described embodiment, the above-described structure is applicable to an upper airflow straightening structure or a side airflow straightening structure.

Further, it is applicable to a cover which is made of non-fiber reinforced resin or metal plate.

Also, any other shape than the arc shape, such as a triangular shape or a rectangular shape, is applicable to the cross sectional shape of the protrusion as long as the traveling-air peeling off (separation) can be promoted compared with a case where the front face of the connection portion is a flat outer surface (airflow straightening face), and its specific shape can be set properly, considering the formability and the traveling-air peeling off (separation) performance of the cover.

What is claimed is:

1. An airflow straightening structure of an automotive vehicle, in which a slit and a connection portion which includes no slit are provided at a rear-end edge portion of a cover having a substantially-flat airflow straightening face extending in a vehicle longitudinal direction such that the slit and the connection portion are aligned in a direction crossing the vehicle longitudinal direction, wherein said connection portion is positioned adjacently, in the direction crossing the vehicle longitudinal direction, to said slit, and a protrusion is provided at the airflow straightening face of the cover, the protrusion being configured to protrude in a direction away from the airflow straightening face of the cover and extend in the direction crossing the vehicle longitudinal direction, wherein said protrusion is positioned such that an area where said protrusion is provided at the airflow straightening face of the cover does not overlap an area where said slit is provided at the rear-end edge portion of the cover in the direction crossing the vehicle longitudinal direction, and said protrusion is configured to extend in the direction crossing the vehicle longitudinal direction from a position corresponding to an end portion, in the direction crossing the vehicle longitudinal direction, of said connection portion to a position corresponding to an opening edge portion, in the direction crossing the vehicle longitudinal direction, of the slit such that at least part of underfloor traveling air flowing down along the surface of the cover toward the protrusion is guided toward the slit by an end portion, in the direction crossing the vehicle longitudinal direction, of the protrusion which is positioned closely to the slit.

2. The airflow straightening structure of the automotive vehicle of claim 1, wherein said slit is composed of plural slits which are aligned substantially in a vehicle width direction at the rear-end edge portion of said cover, and said connection portion is composed of plural connection portions which are respectively positioned between the adjacent slits at the rear-end edge portion of said cover, whereby said plural slits and said plural connection portions are alternately aligned substantially in the vehicle width direction at the rear-end edge portion of the cover.

3. The airflow straightening structure of the automotive vehicle of claim 1, wherein the rear-end edge portion of said cover includes an extension portion which extends substantially linearly along a vehicle width direction and a slant portion which extends obliquely relatively to the vehicle longitudinal direction and the vehicle width direction, the extension portion and the slant portion being provided adjacently, said slit is formed at said extension portion and said connection portion is formed at said slant portion, and said projection is provided at a portion of the airflow straightening face of the cover which is located in front of said slant portion of the rear-end edge portion of the cover.

4. The airflow straightening structure of the automotive vehicle of claim 3, wherein said cover is an under cover which is arranged below a floor of the vehicle, a rear end of which is attached to a vehicle-body member via an attachment portion, said extension portion is positioned substantially just in front of said attachment portion of the under cover, and said slant portion is composed of a pair of right-and-left slant portions which respectively extend obliquely rearward and laterally from right-and-left end portions of said extension portion such that the pair of slant portions are positioned substantially obliquely in front of said attachment portion.

5. The airflow straightening structure of the automotive vehicle of claim 3, wherein said protrusion formed at said slant portion integrally includes an extending protrusion portion which extends substantially in the vehicle width direction continuously from the protrusion.

6. The airflow straightening structure of the automotive vehicle of claim 1, wherein a length of the direction crossing the vehicle longitudinal direction of said protrusion is set to be substantially equal to or longer than a length of a direction crossing the vehicle longitudinal direction of said connection portion.

7. The airflow straightening structure of the automotive vehicle of claim 1, wherein said cover is made of fiber reinforced resin or a nonwoven fabric or woven fabric.

8. The airflow straightening structure of the automotive vehicle of claim 1, wherein said connection portion provided at the rear-end edge portion of the cover is configured such that a basic cross sectional portion thereof is of a crank shape and a thick portion which is thicker than the basic cross sectional portion is provided at a central portion, in a vehicle width direction, thereof.

* * * * *